United States Patent [19]

Tuttle et al.

[11] Patent Number: 4,875,599

[45] Date of Patent: Oct. 24, 1989

[54] CARD CASE WITH POWERED DISPENSER

[76] Inventors: John E. Tuttle, 3605 Artic Blvd. No. 167, Anchorage, Ak. 99503; Sheldon M. Ewing, P.O. Box 870187, Wasilla, Ak. 99687

[21] Appl. No.: 206,438

[22] Filed: Jun. 14, 1988

[51] Int. Cl.[4] ........................ B65G 59/00; B65H 1/08; B65H 3/00; G07F 11/16

[52] U.S. Cl. .................................... 221/231; 221/258; 221/259; 221/102; 221/9

[58] Field of Search .................... 221/9, 13, 15, 22, 23, 221/97, 98, 100, 101, 102, 231, 258, 259, 277

[56] References Cited

U.S. PATENT DOCUMENTS

| | | | |
|---|---|---|---|
| 847,688 | 3/1907 | Plummer | 221/43 |
| 933,663 | 9/1909 | Pollock | 221/43 |
| 2,265,336 | 12/1941 | Banck | 221/99 |
| 3,126,122 | 7/1961 | Sacre | 221/259 X |
| 3,375,956 | 4/1968 | Katz | 221/259 |
| 3,532,337 | 10/1970 | Kratz | 221/13 X |
| 3,602,366 | 8/1971 | Dawidowicz | 221/102 X |
| 4,603,792 | 8/1986 | Molineux | 221/15 X |
| 4,717,043 | 1/1988 | Groover et al. | 221/231 X |

*Primary Examiner*—Joseph J. Rolla
*Assistant Examiner*—Mona C. Beegle
*Attorney, Agent, or Firm*—Michael John Tavella

[57] ABSTRACT

A motorized card dispenser is disclosed that consists of a case with a hinged lid. The lower part of the case has a card storage area and a sealed motor-drive area. The cards are dispensed through a small slot in the front of the case. A dispensing pad, which is driven by a motor is used to dispense the cards. The motor is powered by a small battery located within the case. Three different types of control circuits are disclosed. All three circuits are controlled by a button which is located on the top of the device. A pressure bail, which is spring loaded and hinged, is used to maintain pressure on the cards from the top of the stack. Cards are dispensed from the bottom of the stack. An optional storage case that can be attached to the device to hold business cards that are received by the user is also disclosed.

10 Claims, 3 Drawing Sheets

CARD CASE WITH POWERED DISPENSER

This invention relates to card holders that dispense cards, and particularly to card holders with a mechanical dispenser.

BACKGROUND OF THE INVENTION

Business cards have become common place in many business. When traveling, however, cards become difficult to store. The few types of business card cases that have been developed, simply hold the cards until needed. These cases require two hands to remove a card. Early types of mechanical cases that dispensed tickets used a thumb wheel to dispense the cards. The wheel pushed out the next ticket when manually turned by the user. Example of this type of device are found in U.S. Pat. Nos. 847,688 and 933,663. Although these devices performed well, they are cumbersome to use. A motorized dispenser eliminates the need to turn a wheel, which allows the cards to be dispensed faster and smoother, which reduces potential damage to the card. A timing circuit can be included to control the motor's operation to a fixed period, allowing for precise delivery of each card.

An object of this invention is to provide a powered, self contained card case that will dispense a business card or the like. Another object of this invention is to produce a powered card case that will dispense a card by depressing only one button and having a control device that will dispense the card.

BRIEF DESCRIPTION OF THE INVENTION

The invention consists of a small case designed to hold business cards. The case also has a small compartment that houses a motor, power supply and control circuit. The entire case is approximately the size of a pack of cigarettes. The motor drives a worm gear which then turns a perpendicular shaft within the motor housing in the case. The perpendicular shaft extends through the motor housing into the card storage compartment. The business cards are stored on top of the shaft so that the device will dispense cards from the bottom of the stack of cards. A small slot is provided in the front wall to dispense the cards. A spring loaded bail is used to provide pressure on the top of the stack to ensure that the cards maintain firm contact with the drive shaft at the bottom of the stack. This bail, which is hinged, continues to provide downward pressure as the cards are dispensed. The case has a hinged lid to install new cards. To load the cards, the lid is lifted and the new cards are slid under the spring loaded bail and dropped into place.

The device is operated by a button accessed through the top of the case. The button can drive the motor directly, in which case, the button must be held down until the card is fully dispensed. An integrated circuit timer is included in the preferred embodiment, however, to control the motor once the button is released. This design allows the user to press and release the button and the controller will operate the motor for a fixed time needed to dispense a card.

FIG. **9*a*** is a schematic diagram of one alternate circuit for motor control.

FIG. **9*b*** is a schematic diagram or another alternate circuit for the motor control.

Figure 10:
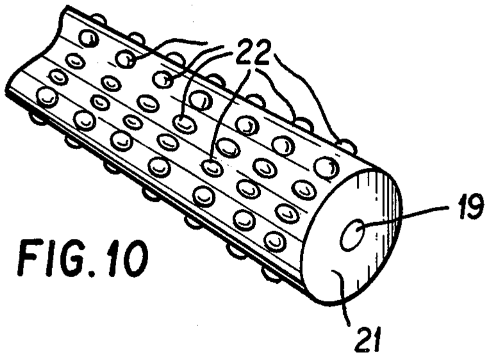

FIG. 10 is a detail view of one type of dispensing pad pattern which utilizes gripping nodules.

Figure 11:
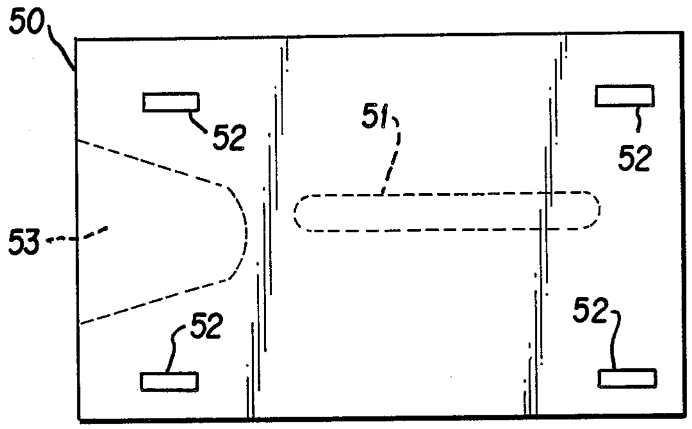

FIG. 11 is a top view of the optional card storage case.

Figure 12:
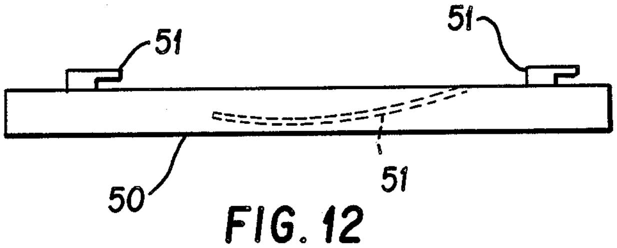

FIG. 12 is a side view of the optional card storage case.

Figure 13:
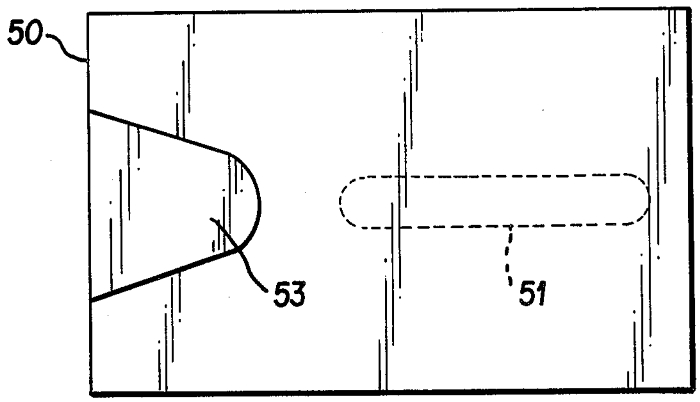

FIG. 13 is a bottom view of the optional card storage case.

Figure 14:
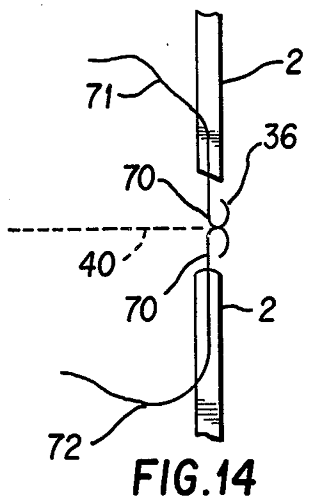

FIG. 14 is a detail view of an auxiliary contact control system.

Figure 15:
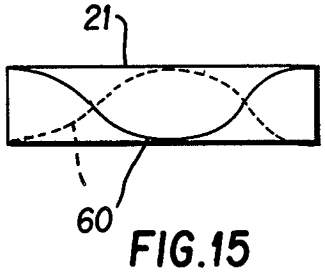

FIG. 15 is a detail of an alternate dispensing pad pattern design.

DETAILED DESCRIPTION OF THE INVENTION

Figure 8:
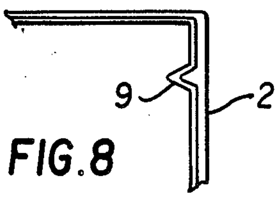
FIG. 8 is a detail view of a lid latch.

Referring now to the drawing figures and particularly to FIGS. 1, 2 and 4, 6 and 7, the device 1 has a lower housing 2 and a hinged lid 3. The lid 3 is attached to the lower housing 2 by two hinges 5 and 6. The hinges 5 and 6 are pin and socket hinges known in the art and are found on numerous plastic cases. The lid 3 is opened by slot 7 which is formed in the front of the lid as shown. The lid 3 is secured by two latches 8 and 9. A cross section through latch 9 is shown in FIG. 8. The lid 3 has an access hole 10 that allows the user to access a button 11 through the lid 3. The button is located on a plate 12 which is used to support the button 11 and the associated wires 13 as shown. A grate 30 forms the lower card platform and is placed as shown. The grate traps dust and debris from the cards 40 and keeps it away from the dispensing mechanism. This will help prevent jams if the mechanism becomes clogged. The grate 30 extends along the entire length of the case up to the dispensing pad 21. A small space between the grate 30 and the dispensing pad 21 is provided to prevent the dispensing pad 21 from being inadvertently jammed by the grate 30. The grate 30 is not shown in FIG. 2 for clarity.

Figure 1:
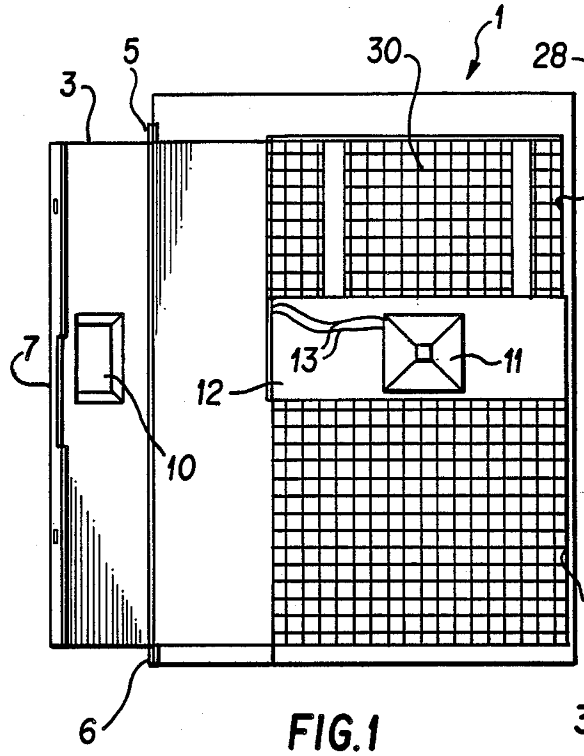
FIG. 1 is a top view of the device with the lid in the open position.
Figure 2:
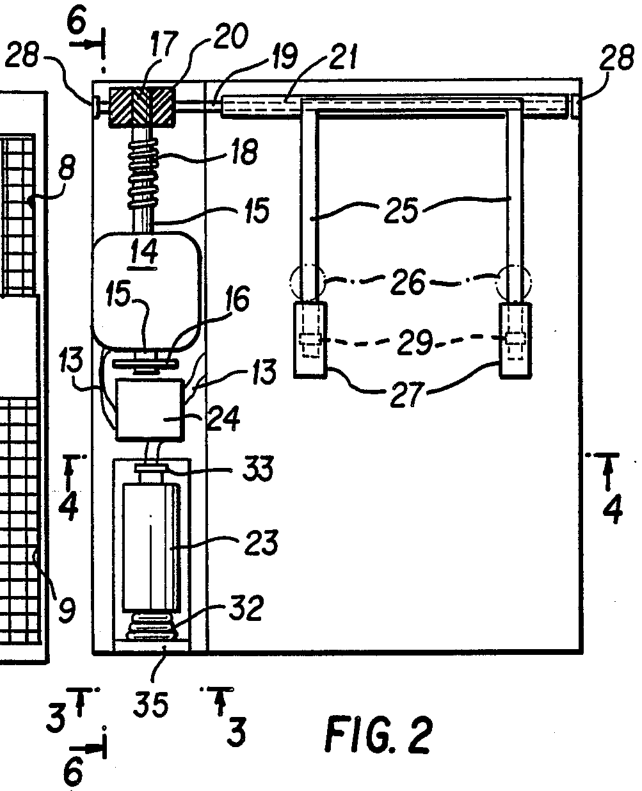
FIG. 2 is a top section view of the invention along the lines 2—2.
Figure 3:
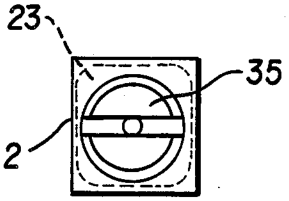
FIG. 3 is a detail view of the battery cap along the lines 3—3.
Figure 4:
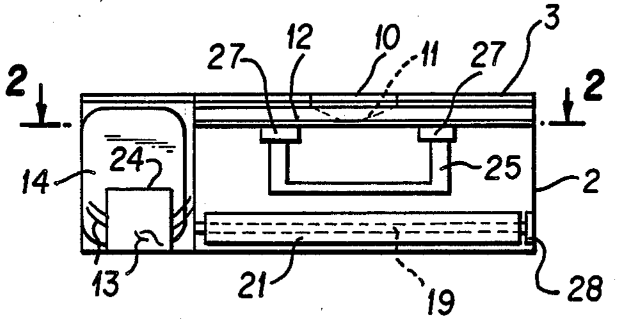
FIG. 4 is a section view through the center of the invention along the lines 4—4.
Figure 5:
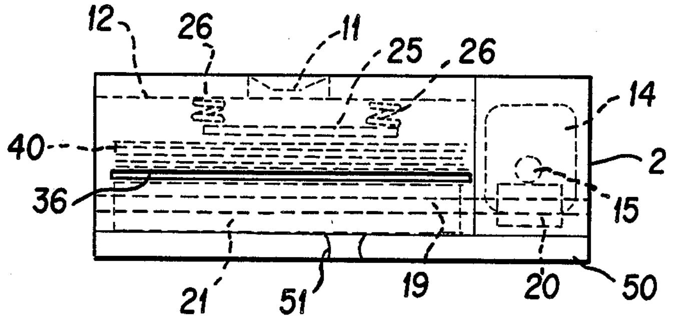
FIG. 5 is a front view of the device showing the dispensing slot for the cards and the optional card storage case.

Referring now to FIGS. 2 and 4, the cards 40 are held in place by a pressure bail 25. The bail 25 is spring loaded by springs 26 to maintain continuous pressure on the stack of cards 40. This ensures proper flow of the cards and reduces jamming as the card stack diminishes. The pressure bail 25 is supported by two pivot mounts 27 as shown. The pressure bail 25 is secured within the pivot mounts by pins 29. The pivot mounts 27 allow the bail to pivot up or down as cards 40 are loaded or dispensed. The pivot mounts are secured to the underside of the plate 12.

Figure 6:
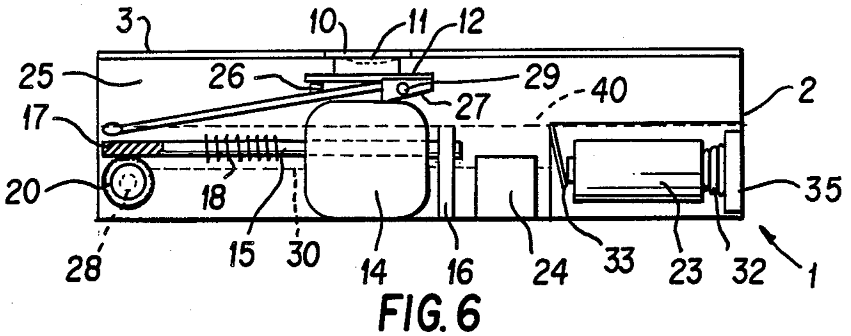
FIG. 6 is a section view of the left side of the device along the lines 6—6.
Figure 7:
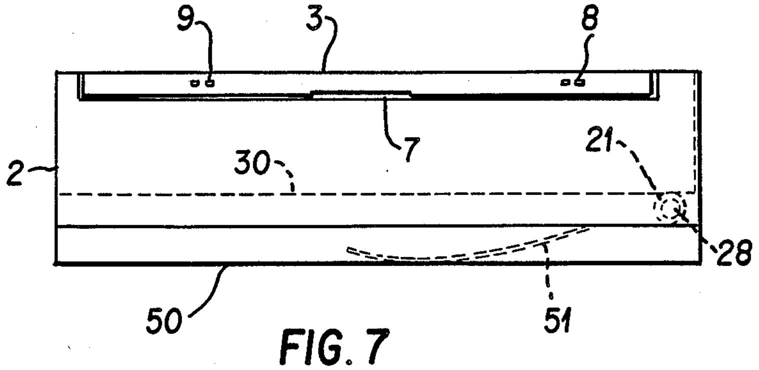
FIG. 7 is a right side view of the invention also with the optional card storage case.

Referring now to FIG. 2 and 6, the drive mechanism consists of a miniature ironless armature motor 14. The motor 14 has a shaft 15, which extends from both ends of the motor 14. The shaft 15 is supported by a mount and bearing assembly 16 positioned behind the motor. The shaft 15 is connected to the drive gear 17 by a spring 18. The drive gear 17 is a standard worm gear. The drive gear 17 contacts transfer gear 20, which is installed on the drive shaft 19. The drive shaft 19 turns a dispensing pad 21, which is positioned as shown. The dispensing pad 21 has a matrix of nodules 22 (see FIG. 11) around the circumference to grip the card 40 as it is dispensed. FIG. 15 shows a second dispensing pad design. In this design, the dispensing pad 21 has a helical rib 60 which is placed on both sides of the dispensing pad 21. The helical rib 60 is also canted toward the center of the dispensing pad 21, which helps to maintain proper placement of the card 40 while it is dispensed and reduces any tendency for lateral card movement through the exit slot 36.

Referring now to FIGS. 2, 6, 9 and 10, the motor is powered by a battery 23. In the preferred embodiment, the battery 23 is a type "N" battery, although any other similar type battery can be used providing that it meets the power requirements of the motor 14. The battery 23 is held is a battery compartment within the motor-control compartment. A screw cover 35 is used to access the battery compartment. The screw cover 35 has a contact spring 32 which acts as the negative pole contact and ensures that the battery 23 is securely held in place. A positive pole contacts 33 is placed at the opposite end of the battery compartment as shown. The positive pole contact 33 acts like a spring to ensure good contact with the battery 23. Wires 13 are connected to these terminals as shown in the schematic diagrams in FIG. 9.

Figure 9A:
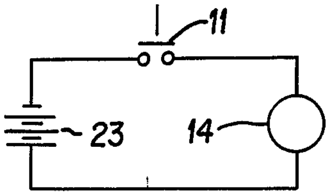
FIG. 9 is a schematic diagram of a timing circuit for the motor operation.
Figure 9:
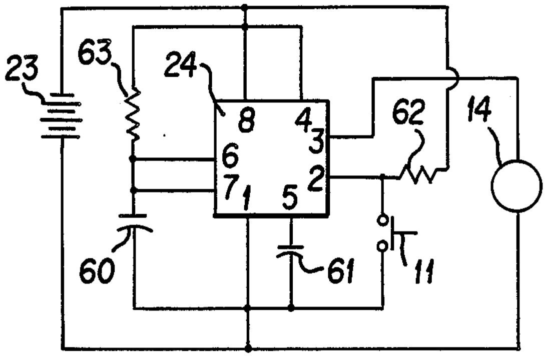

In one control circuit embodiment, the motor is controlled by a timing circuit 24 as shown in FIG. 9. This circuit uses an integrated circuit (IC) timer 24 such as a 555 timer by Motorola or equivalent. FIG. 9 shows a typical timing circuit using a 555 IC. Resistors 62 and 63 and capacitors 60 and 61 are used to adjust the timing cycle. The timing will depend on the motor speed and gear ratios used, but generally should be set between one and two seconds. The time is set by the values of the capacitors 60 and 61 and resistors 62 and 63 by methods known in the art. Although this particular timing circuit is shown, any comparable circuit can be substituted.

FIG. 9a shows a simpler operating circuit. In this design, the circuit is operated by the momentary type push button 11 which directly controls the motor 14. This alternative circuit does not use a timing circuit. Rather, the button 11 must be depressed continuously to dispense a card 40. Once the card 40 is dispensed, the button 11 is released. Although simpler than the timing control circuit, this design lacks the control needed to precisely and uniformly dispense the cards 40.

Figure 9B:
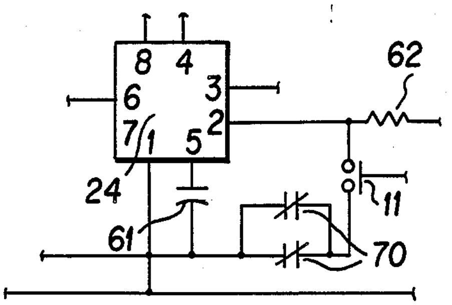

FIG. 9b shows a change to the first circuit and is the preferred embodiment. The change consists of installing two pair of auxiliary contacts 70 within the dispensing slot 30, at the corners of the slot (see FIG. 14 for a detail). The auxiliary contacts are normally closed and are placed in series with the button 11. The auxiliary contacts 70 are opened when a card 40 is in the dispensing slot 30. When the auxiliary contacts 70 are opened, the drive circuit cannot inadvertently be started, which can jam the mechanism or double up cards. Two pair of contacts are preferred because the tolerances are close and one set of contacts can fail to fully close with repeated operation.

Referring now to FIGS. 5, 11, 12, and 13, an optional card storage case 50 can be added to the bottom of the device. This case is used to store cards received during business calls. The storage case 50 is a rectangular box completely enclosed except for the front, where the cards are fed for storage, and a small access hole 53 at the back of the holder 50. A spring loaded retainer 51 is installed within the holder 50 as shown. The retainer is used to hold the cards in place for storage. The storage case 50 can be fastened to the base of the device using difference means known in the art. For example, FIG. 12 shows lugs 52 that are placed in corresponding slots cut into the bottom of the device. The lugs 52 are placed in the slots and the storage case 50 is then slid forward until it is locked in place. Alternatively, VELCRO strips can be placed on the bottom of the container, or plugs and keyed slots can be used. The storage holder 50 is meant to be an option and is not necessary to operate the device.

The invention is used by opening the lid and loading a supply of cards 40 into the housing. The cards 40 are then slipped under the pressure bail 25 and then laid onto the grate 30. To dispense a card, the user pushes and release the button 11. The control circuit 24 then starts and runs the motor for a predetermined time needed to dispense the card. The device is designed to dispense only a part of the card (approximately 80%). Once the card is dispensed part way out of slot 36, it is manually pulled from the device. The device is then ready to begin a new cycle. When the cards have been dispensed, the lid is opened and any dust trapped by the grate can be shaken out and a new set of cards can be loaded. When the battery becomes weak, the screw cover 35 is removed for battery replacement. The optional storage holder has been discussed above.

The present disclosure should not be construed in any limited sense other than that limited by the scope of the claims having regard to the teachings herein and the prior art being apparent with the preferred form of the invention disclosed herein and which reveals details of structure of a preferred form necessary to better understand the invention and may be subject to change by skilled persons within the scope of the invention without departing from the concept thereof.

I claim:

1. A motorized card case for dispensing business cards and the like comprising:

(a) a lower case having a front, said front having a dispensing slot, a bottom, a grate, fixedly attached within said lower case, above said bottom, said grate forming a lower card platform on which a stack of cards are placed, four sides, and having an open top;

(b) a lid, hingably attached to the top of said lower case;

(c) motor means installed within said lower case;

(d) drive means connected to said motor means such that said drive means are positioned within said case to propel a card from said lower case through said dispensing slot and out of said device;

(e) actuating means, fixedly installed within said lower case, to engage said motor means;

(f) power supply means, fixedly installed within said lower case, to power said motor means; and (g) a pressure ball hingably mounted in said lower case to retrain the stack of cards.

2. The motorized card case of claim 1 wherein said actuating means comprise a momentary contact button wired in series with the power supply means and the motor means.

3. The motorized card case of claim 1 wherein said actuating means comprise a momentary contact button wired to a timing circuit which is then connected to the motor such that when the momentary contact button is depressed, the timing circuit is actuated, which will then operate the motor independent of the momentary contact button until a pre-established timing cycle is complete.

4. The motorized card case of claim 1 further comprising:

(a) a removable storage case having a top, a bottom, and three sides, being open on one side; said bottom also having an access port to allow entry into the interior of said removable storage case;

(b) a spring loaded retainer fixedly attached to the top of said removable storage case such that cards stored within said removable storage case are restrained from movement; and (c) means to secure said removable storage case to the motorized card case.

5. The motorized card case of claim 3 further comprising a plurality of spring loaded contact pairs positioned within the dispensing slot in said front of said lower case, such that when a card is dispensed, the card forces individual contacts within a contact pair apart; said plurality of contact pairs also being wired in parallel and then wired in series, as one group, with the momentary contact switch such that when a card is being dispensed, said contacts are open, disabling said button from beginning a new motor drive cycle until said card is removed and said contact pairs close.

6. A motorized card case for dispensing business cards and the like comprising:

(a) a lower case having a front, said front having a dispensing slot, a bottom, four sides, and having an open top;

(b) a lid, hingably attached to the top of said lower case;

(c) motor drive means installed within said lower case;

(d) drive means connected to said motor means such that said drive means are positioned within said case to propel a card from said lower case through said dispensing slot and out of said device;

(e) a momentary contact button wired to a timing circuit which is then connected to the motor such that when the momentary contact button is depressed, the timing circuit is actuated, which will then operate the motor independent of the momentary contact button until a pre-established timing cycle is complete;

(f) power supply means, fixedly installed within said lower case, to power said motor means;

(g) a pressure bail hingedly mounted in said lower case to restrain the cards; and (h) a grate, fixedly attached with said lower case and forming a lower card platform on which said cards are placed.

7. The motorized card case of claim 6 further comprising a plurality of spring loaded contact pairs positioned within the dispensing slot in said front of said lower case, such that when a card is dispensed, the card forces individual contacts within a contact pair apart; said plurality of contact pairs also being wired in parallel and then wired in series, as one group, with the momentary contact switch such that when a card is being dispensed, said contacts are open, disabling said button from beginning a new motor drive cycle until said card is removed and said contact pairs close.

8. The motorized card case of claim 6 wherein said drive means comprise:

(a) a first worm gear flexibly attached to a motor shaft;

(b) a second worm gear fixedly attached to a drive shaft and positioned perpendicularly with respect to said first worm gear, such that said second worm gear is in contact with and engages the first worm gear and transfers the rotation of the motor shaft to the drive shaft;

(c) a cylindrical pad, having an outer surface, two ends and a center, fixedly attached to said drive shaft, said cylindrical pad having gripping means placed thereon to ensure a proper grip on the card as the card is dispensed from the device.

9. The motorized card case of claim 8 wherein said gripping means comprise a plurality of nodules fixedly placed in a uniform pattern around the outer surface of the cylindrical pad.

10. The motorized card case of claim 8 wherein said gripping means comprise two helical ridges fixedly placed on the outer surface of said cylindrical pad; said helical ridges extending longitudinally along the length of the cylindrical pad and said helical ridges also being canted from the two ends of the cylindrical pad to the center of the cylindrical pad, said canting being used to maintain the lateral position of the card as the card is dispensed.

* * * * *